2 Sheets—Sheet 1.

H. W. FULLER,

Assignor, by mesne assignements, to I. W. BARNUM.

Mechanism for Marking Cloth in Sewing-Machines.

No. 8,103. Reissued Feb. 26, 1878.

*Attest*
Geo. H. Miatt
T. H. Harrah.

*Inventor.*
Henry W. Fuller
By his attorney
E N Dickerson Jr

N. PETERS, PHOTO-LITHOGRAPHER, WASHINGTON, D. C.

2 Sheets—Sheet 2.

H. W. FULLER,

Assignor, by mesne assignements, to I. W. BARNUM.

Mechanism for Marking Cloth in Sewing-Machines.

No. 8,103. Reissued Feb. 26, 1878.

*Attest.*
Geo. H. Miatt
T. H. Harrah.

*Inventor.*
Henry W. Fuller
By his attorney
E. N. Dickerson Jr.

N. PETERS, PHOTO-LITHOGRAPHER, WASHINGTON, D. C.

UNITED STATES PATENT OFFICE.

HENRY W. FULLER, OF BROOKLYN, NEW YORK, ASSIGNOR, BY MESNE ASSIGNMENTS, TO ISAAC W. BARNUM.

IMPROVEMENT IN MECHANISMS FOR MARKING CLOTH IN SEWING-MACHINES.

Specification forming part of Letters Patent No. 28,633, dated June 5, 1860; extended seven years; Reissue No. 8,103, dated February 26, 1878; application filed October 20, 1877.

*To all whom it may concern:*

Be it known that I, HENRY W. FULLER, of Brooklyn, in the county of Kings and State of New York, have invented, made, and applied to use certain new and useful Improvements in Means for Marking Cloth in Sewing-Machines; and I do hereby declare that the following is a full, clear, and exact description of the construction and operation of the same, reference being had to the annexed drawing, making part of this specification, wherein—

Figure 1:
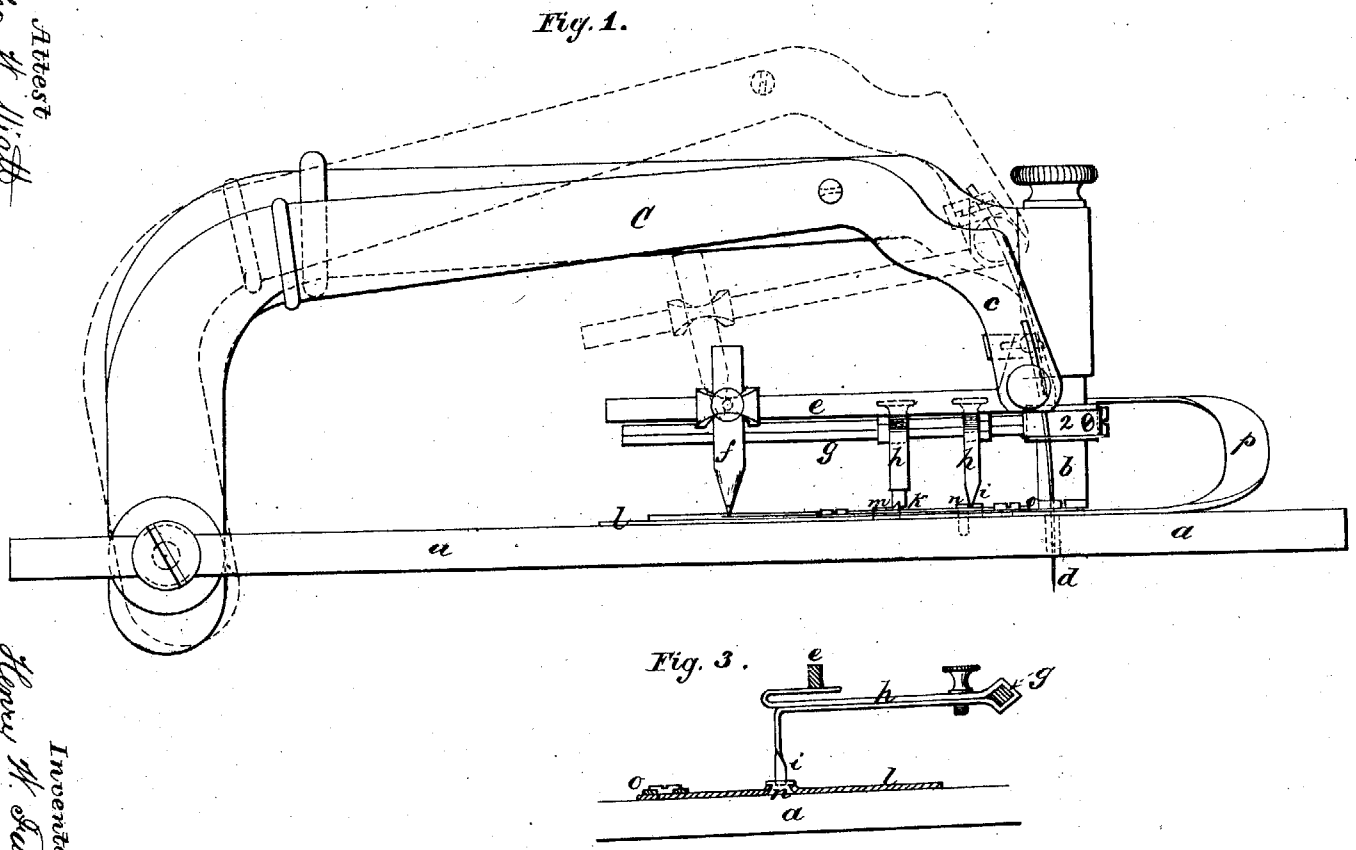
Figure 2:
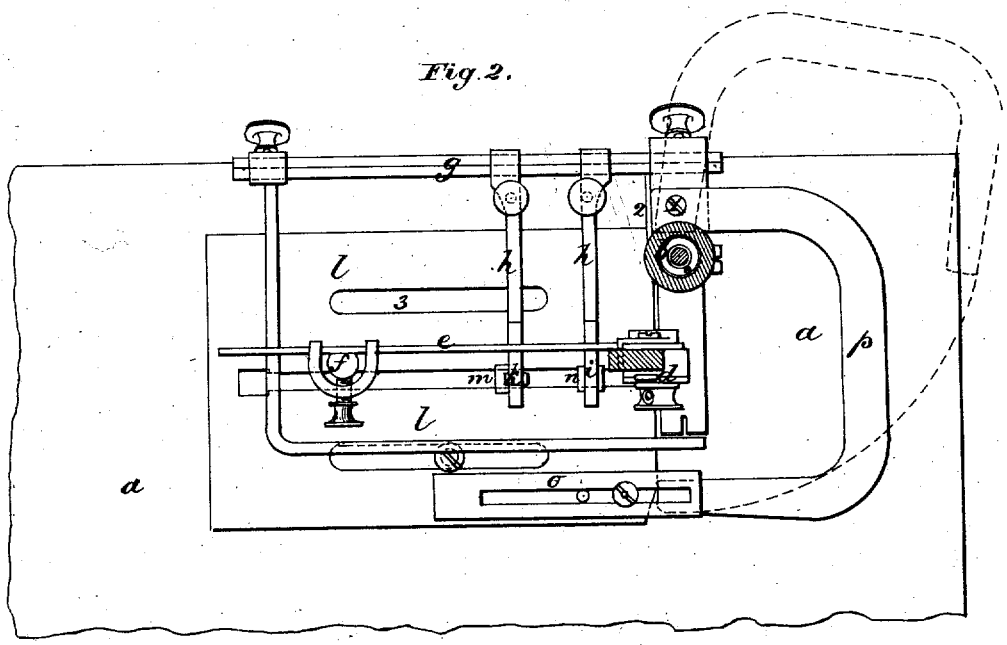

Figure 1 is a side elevation, showing my apparatus, also the needle-arm and presser-foot of a sewing-machine; and Fig. 2 is a plan of the same, with the arms removed to show the other parts.

Similar marks of reference denote the same parts.

The object of my invention is to so improve the sewing-machine by the combination with it of under and upper markers on opposite sides of the cloth as to enable me to crease cloth for tucks and plaits automatically on a sewing-machine, in contradistinction to marking and creasing each tuck or plait separately by hand preparatory to sewing each separately, as was done prior to my invention in all cases known, and also to enable me to sew one seam for a tuck or plait previously creased in cloth, and simultaneously to form a crease for another tuck or plait in the same cloth automatically.

The nature of my invention consists in a vibrating instrument or instruments that move in unison with the needle, so as to crease or mark the cloth at a given distance or distances from the needle, and the same, not pressing on the cloth except while the needle is in it, prevents such marking-instrument obstructing the cloth in its movements by the feed, and hence said mark can be made at any distance from the sewing, and the cloth remain smooth.

By the use of a point vibrating in unison with the needle, and acting on the upper surface of the cloth in connection with a notch or an elastic surface or pad below the cloth, a crease will be made whose ridge is below the cloth, and by the use of a point below the cloth and a vibrating notch or elastic pad above, a crease will be formed whose ridge is on the upper side of the cloth, and by the use of one, two, or more of these up or down markers, or one up and one down marker, the crease or ridge can be made exactly at the desired distance from the line of sewing, and either upward or downward, according to the way in which the cloth is to be folded over for the after operations, and on performing another line of sewing the crease or creases are made for the next fold.

This device is especially useful in all kinds of tucking, and in plaiting shirt-bosoms and similar work.

By the use of a vibrating pencil or chalk, a line of marks is made by which a second line of stitching is guided, the same being useful in quilting or performing any straight, or curved, or parallel lines of stitching.

It will be evident that if the marking-points are at right angles to the feed from the needle, the marking must be a given distance from the sewing, and parallel thereto, regardless of the curved or zigzag form in which the sewing is performed.

In the drawing, *a* represents the bed of any sewing-machine. *b* is the presser-foot, and *c* the needle bar or arm, all of which may be of any form, and the sewing is to be performed by the needle *d*, in connection with a shuttle, looper, or any device. *e* is an arm extending from the needle arm or bar, and vibrating with the same. *f* is a pencil chalk or point adjusted on said arm *e*, so that in its vibrations the point shall press upon the cloth, and consequently make a mark thereon at the distance from, and parallel to, the line of sewing being performed at which the second row of sewing is to be made. This is especially adapted to marking for quilting or stitching.

*g* is a bar that may be attached to the presser-foot, so as to be raised up with it, or may be sustained in any other convenient manner. *h h* are adjustable marking-arms that extend from the bar *g*, and are provided, one with a marking-point, *i*, and the other with a marking-notch, *k*. The arms *h* are formed as springs, so that the parts *i* and *k* are raised from the surface of the cloth, except when acted on by the arm *e;* and said arms *h* are also fitted with springs, taking the arm *e*, so as to yield in case of inequality in the thickness of cloth, and not interfere with the full stroke of the needle-bar.

Figure 4:
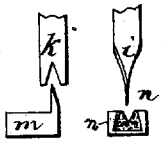
Figure 5:
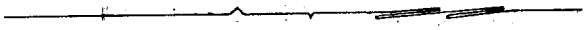

*l* is a plate screwed onto the bed *a*, and carrying the adjustable point *m* and leather *n*, or its equivalent. The point *m* is formed somewhat similar to the point *i*, both being thin rounded and blunt chisel forms, so as not to injure or catch in the cloth; and this point *m* may be fitted to slide in a groove for adjusting the same to the desired distance from the needle; or several of these points may be formed or attached permanently on a plate at short distances apart. The leather *n* is also represented as adjustable, and it forms a crease, into which the point *i* acts, and said leather may be set into a small metal holder, or it may be formed as a strip of sufficient length to comprise the distance to which the part *i* may be adjusted. The operation of this part is illustrated in Figs. 4 and 5, where the marking parts *i n* and *k m* are shown in larger size, and the fold or crease produced in the cloth is also represented. The points *i n* produce a downward crease and the parts *k m* an upward crease when the cloth is exposed to the action of these parts by passing between the same; and in order to give motion to these markers, the bar or arm *e* strikes on the spring part of the arms *h h*, Fig. 3, pressing the surfaces together, and crimping or creasing the cloth.

The drawing represents my apparatus as adapted for stitching three-ply shirt-bosoms, as seen in Fig. 5, in which instance the plait folded under the cloth runs against the end of the plate *l* as a guide, and the adjustable spring-finger *o*, pressing on the plait, keeps it folded down tightly, ready to pass under the presser-foot *b*.

*p* is a swinging guide, attached by the screw 1 to the arm carrying the bar *g*, and acted on by the spring 2, to keep the end of the guide within the plait and the back of the plait against the end of the plate *l*, so that the stitching will be upon the edge of the plait with unerring certainty.

For tucking, the markers should extend on the other side of the needle-arm, and for this purpose the bar *g* can be fitted in any convenient manner; but where a holder or arm to the presser-foot is used in the manner shown, the hole into which said bar sits may pass through the same, and be provided with a clamping-screw, so that said bar *g* can be inserted from the other side, and the plate *l* also stand on the other side of the needle, a second slot, 3, being provided for this purpose. The arm *e* also requires to be changed to the other side, in order to take the marking-points *i n*.

It will be evident that the marking notch or point *i* or *k*, or both, might be placed directly on the arm *e*, and provided with a suitable spring between the bar and point.

The manner of attaching the parts to the sewing-machine must also be varied, as circumstances may require, for different characters of sewing-machines, or for different kinds of work to be performed, and the vibrating motion may be given to the markers by any other device besides the needle-bar.

The relations between the markers and the needle must be the same on all kinds of sewing-machines for any given kinds of work; and as the skill of the mechanic is fully competent to make such changes in various ways without invention, I do not claim any of the particular parts as described, nor any particular manner of attaching the markers to the sewing-machine, or of vibrating them.

Having thus fully described my invention and its object, and shown two different ways of attaching as well as vibrating the markers in unison with the needle of a sewing-machine, and having stated that the manner of attaching the parts must be varied, as circumstances require, for different characters of sewing-machines, or for different kinds of work to be performed, I do not claim a gage for spacing off the width of folds, tucks, or plaits, either in a sewing-machine or applied as a separate apparatus for said purpose; but all the previous devices with which I am acquainted acted simply to perforate the goods or form a mark at a given point to which the goods had to be folded by hand, whereas my apparatus makes a complete crease in the cloth, so that the parts of the cloth, when laid over each other, fold down at these creases without requiring creasing by hand as a separate and prerequisite operation.

What I do claim as my invention, and which I desire to secure by Letters Patent of the United States, is as follows:

1. In a tuck creaser or marker, the combination of an arm or bar supporting a spring-arm at right angles to it, carrying a marker, a bed-plate resting on the bed-plate of the sewing-machine supporting a marker, and an arm or bar adapted to be operated by the needle-arm of said machine striking and forcing down the spring-arm carrying the upper marker, for the purposes specified.

2. The combination, with the bed-plate supporting a marker, of a vibrating arm carrying a second marker and connecting mechanism, substantially as specified.

3. A tuck-creasing mechanism and a sewing-machine arranged, connected, and combined together substantially as described, so that one tuck may be sewed and a fold creased parallel thereto for a succeeding tuck simultaneously therewith, substantially as set forth.

4. The combination, with the stitch-forming and feeding mechanism of a sewing-machine, of two or more creasing-markers arranged above and below the cloth, whereby a continuous crease is marked in the cloth parallel to a seam being sewed therein, substantially as specified.

5. In combination with the needle arm or bar of a sewing-machine, and vibrating therewith, an arm carrying a pencil-point or other pigment to mark a line on the surface of cloth parallel to the line of seam, as set forth.

H. W. FULLER.

Witnesses:
E. N. DICKERSON, Jr.,
GEO. H. EVANS.